(12) United States Patent
Chen et al.

(10) Patent No.: US 9,967,333 B2
(45) Date of Patent: *May 8, 2018

(54) DEFERRED CONFIGURATION OR INSTRUCTION EXECUTION USING A SECURE DISTRIBUTED TRANSACTION LEDGER

(71) Applicant: DELL PRODUCTS L.P., Round Rock, TX (US)

(72) Inventors: YuLing Chen, Fremont, CA (US); Daniel A. Ford, Mount Kisco, NY (US)

(73) Assignee: DELL PRODUCTS LP, Round Rock, TX (US)

( * ) Notice: Subject to any disclaimer, the term of this patent is extended or adjusted under 35 U.S.C. 154(b) by 111 days.

This patent is subject to a terminal disclaimer.

(21) Appl. No.: 14/732,504

(22) Filed: Jun. 5, 2015

(65) Prior Publication Data

US 2016/0261685 A1    Sep. 8, 2016

Related U.S. Application Data

(63) Continuation-in-part of application No. 14/702,321, filed on May 1, 2015, which is a continuation-in-part of application No. 14/635,577, filed on Mar. 2, 2015.

(51) Int. Cl.
*H04L 29/08*  (2006.01)
*G06F 9/445*  (2018.01)
(Continued)

(52) U.S. Cl.
CPC .......... *H04L 67/104* (2013.01); *H04L 41/082* (2013.01); *H04L 41/28* (2013.01);
(Continued)

(58) Field of Classification Search
None
See application file for complete search history.

(56) References Cited

U.S. PATENT DOCUMENTS 6,591,292 B1     7/2003  Morrison
7,130,999 B2 *  10/2006  Yasala ................. H04L 63/0823
                                                                 713/157
(Continued)

OTHER PUBLICATIONS

Peck, "Do You Need a Blockchain? This Chart will tell you if the technology can solve your problem", Oct. 2017, IEEE, p. 1-3.*

(Continued)

*Primary Examiner* — Christopher Revak
(74) *Attorney, Agent, or Firm* — North Weber & Baugh LLP

(57) ABSTRACT

Aspects of the present invention provide systems and methods that facilitate communicating a message, independent of a centralized resource, to be retrieved at a future time. In embodiments, a computing device receives a configuration-related message via a block chain maintained by a plurality of decentralized nodes. In embodiments, upon verification of the authenticity of the message, the device will execute the deferred instructions indicated in the message. In embodiments, the instructions may be add functionality or not allow functionality in the device. In embodiments, the instructions may indicate that a smart package should allow the end user to access contents of the package or to not allow access to the contents.

20 Claims, 9 Drawing Sheets

(51) Int. Cl.
*H04L 12/24* (2006.01)
*H04L 29/06* (2006.01)
*H04W 12/08* (2009.01)
*H04W 12/10* (2009.01)

(52) U.S. Cl.
CPC .............. *H04L 63/10* (2013.01); *H04L 63/20* (2013.01); *H04W 12/08* (2013.01); *H04L 63/126* (2013.01); *H04L 2209/38* (2013.01); *H04L 2209/56* (2013.01); *H04W 12/10* (2013.01)

(56) References Cited

U.S. PATENT DOCUMENTS

| | | | |
|---|---|---|---|
| 7,293,270 B1 | 11/2007 | Gupta | |
| 8,886,570 B1 | 11/2014 | Amancherla | |
| 9,135,787 B1 | 9/2015 | Russell | |
| 9,256,467 B1 | 2/2016 | Singh | |
| 9,298,806 B1 | 3/2016 | Vessenes | |
| 9,397,985 B1 | 7/2016 | Seger, II | |
| 9,406,063 B2 | 8/2016 | Zhou | |
| 9,514,293 B1* | 12/2016 | Moritz | G06F 21/316 |
| 2001/0049726 A1 | 12/2001 | Comeau | |
| 2002/0143819 A1 | 10/2002 | Han | |
| 2005/0004804 A1 | 1/2005 | English | |
| 2006/0069647 A1 | 3/2006 | Cozianu | |
| 2006/0100955 A1 | 5/2006 | Baldassini et al. | |
| 2008/0320565 A1* | 12/2008 | Buch | H04L 12/581 726/4 |
| 2009/0150972 A1 | 6/2009 | Moon | |
| 2012/0163584 A1 | 6/2012 | Adjedj | |
| 2013/0329883 A1 | 12/2013 | Tamayo-Rios | |
| 2014/0201057 A1 | 7/2014 | Shuster | |
| 2014/0279433 A1 | 9/2014 | Holman | |
| 2014/0344015 A1 | 11/2014 | Puértolas-Montañés et al. | |
| 2015/0006739 A1 | 1/2015 | Misra et al. | |
| 2015/0228004 A1 | 8/2015 | Bednarek | |
| 2015/0287026 A1 | 10/2015 | Yang | |
| 2015/0310424 A1* | 10/2015 | Myers | G06Q 20/3678 705/69 |
| 2015/0348017 A1* | 12/2015 | Allmen | G06Q 20/367 705/76 |
| 2015/0356524 A1 | 12/2015 | Pennanen | |
| 2015/0356555 A1 | 12/2015 | Pennanen | |
| 2015/0371224 A1* | 12/2015 | Lingappa | G06Q 20/065 705/71 |
| 2015/0379510 A1* | 12/2015 | Smith | G06Q 20/3829 705/71 |
| 2016/0071108 A1 | 3/2016 | Caldera | |
| 2016/0086175 A1 | 3/2016 | Finlow-Bates | |
| 2016/0162882 A1 | 6/2016 | McClung, III | |
| 2016/0217436 A1* | 7/2016 | Brama | G06Q 20/06 |
| 2016/0218879 A1 | 7/2016 | Ferrin | |
| 2016/0254910 A1 | 9/2016 | Finlow-Bates | |
| 2016/0260069 A1 | 9/2016 | Holman | |
| 2016/0260169 A1* | 9/2016 | Arnold | G06Q 40/12 |
| 2016/0267472 A1 | 9/2016 | Lingham | |
| 2016/0275461 A1 | 9/2016 | Sprague | |
| 2016/0283920 A1 | 9/2016 | Fisher | |
| 2016/0292672 A1 | 10/2016 | Fay | |
| 2016/0300227 A1 | 10/2016 | Subhedar | |
| 2016/0300234 A1* | 10/2016 | Moss-Pultz | G06Q 20/3829 |
| 2016/0306966 A1 | 10/2016 | Srivastava | |
| 2016/0321654 A1 | 11/2016 | Lesavich | |
| 2016/0330027 A1* | 11/2016 | Ebrahimi | H04L 9/3066 |
| 2016/0330031 A1* | 11/2016 | Drego | H04L 9/3239 |
| 2016/0335628 A1 | 11/2016 | Weigold | |
| 2016/0342977 A1* | 11/2016 | Lam | G06Q 20/3829 |
| 2016/0342978 A1* | 11/2016 | Davis | G06Q 20/382 |
| 2016/0342989 A1* | 11/2016 | Davis | G06Q 20/385 |
| 2016/0342994 A1* | 11/2016 | Davis | G06Q 20/027 |
| 2016/0344543 A1 | 11/2016 | Alness | |
| 2016/0350749 A1* | 12/2016 | Wilkins | G06Q 20/382 |
| 2016/0358184 A1 | 12/2016 | Radocchia | |
| 2017/0005804 A1* | 1/2017 | Zinder | H04L 9/3247 |
| 2017/0061398 A1* | 3/2017 | Joseph | G06Q 20/0658 |
| 2017/0236123 A1* | 8/2017 | Ali | G06Q 20/401 705/75 |
| 2017/0243241 A1* | 8/2017 | Boutelle | G06Q 30/0229 |
| 2017/0279800 A1* | 9/2017 | Castinado | H04L 63/0861 |
| 2017/0295021 A1* | 10/2017 | Aranda Gutierrez | H04L 9/3239 |
| 2017/0310653 A1* | 10/2017 | Zhang | H04L 63/08 |

OTHER PUBLICATIONS

Crosby et al, "BlockChain Technology, Beyond Bitcoin", Oct. 16, 2015, Sutardja Center fro Entrepreneurship & Technology Technical Report, p. 1-35.*

Boudguiga et al, "Towards Better Availability and Accountability for IoT Updates by means of a Blockchain", 2017, 2017 IEEE European Symposium on Security and Privacy Workshops (EuroS &PW), p. 50-58.*

"BitCloud," printed from the internet: URL:http://www.bitcloudproject.org, 2014, 14pgs.

Buterin, Vitalik, Ethereum White Paper, "A Next Generation Smart Contract & Decentralized Application Platform," 2014, printed from the internet: URL:http://ethereum.org/pdfs/ethereumwhitepaper.pdf, 36pgs.

Satoshi Nakamoto, "Bitcoin: A Peer-to-Peer Electronic Cash System," 9pgs.

Wood, Dr. Gavin , "Ethereum: A Secure Decentralised Generalised Transaction Ledger Final Draft—Under Review," www.ethereum.org, 2014, printed from the internet: URL:http://gavwood.com/paper.pdf, 29pgs.

Namecoin, printed from the internet: URL:http://namecoin.info/, 3pgs.

Syscoin, printed from the internet: URL:http://syscoin.org/, 2pgs.

Syscoin, printed from the internet: URL:http://syscoin.org/doc_uploads/How_Syscoin_Innovates_Infographic.png.

Szabo, Nick, "The Mental Accounting Barrier to Micropayments," printed from the internet: URL:http://szabo.best.vwh.net/micropayments.html, 1996, 4pgs.

Non-Final Office Action dated Dec. 16, 2016, in U.S. Appl. No. 14/702,321 (16 pgs).

Response filed Mar. 16, 2017, in related U.S. Appl. No. 14/702,321 (13 pgs).

Non-Final Office Action dated Jan. 17, 2017, in U.S. Appl. No. 14/750,822 (18 pgs).

Non-Final Office Action dated Jan. 20, 2017, in U.S. Appl. No. 14/725,347 (42 pgs).

Underwood, "Blockchain Beyond Bitcoin", Nov. 2016, Communications of ACM, vol. 59, No. 11, p. 15-17, (3 pgs).

Maxwell et al, "'Effing' the Ineffable: Opening up Understandings of the Blockchain", Jul. 2015, British HCI, ACM, p. 208-209, (pp. 2).

Crary et al, "Peer-to-Peer Affine Commitment using Bitcoin", Jun. 2015, PLDI' 15, ACM, p. 479-488, (10 pgs).

Dziembowski, "Introduction to Cryptocurrencies", Oct. 2015, CCS' 15, ACM, p. 1700-1701, (2 pgs).

Coeckelbergh et al, "Cryptocurrencies as Narrative Technologies", Sep. 2015, SIGCAS Computers & Society, vol. 45, No. 3, p. 172-178, (7pgs).

Anteniese et al, "Certified Bitcoins", Sapienza—University of Rome, Italy, ACNS 2014, pp. 80-96, (17 pgs).

Barber et al, "Bitter to Better-How to make Bitcoin a Better Currency," 2012, pp. 399-414, (16pgs).

Kitahara et al, "A Method of Digital Rights Management based on Bitcoin Protocol", Jan. 2014, IMCOM (ICUIMC), ACM p. 1-6, (6 pgs).

Non-Final Office Action dated Jun. 22, 2017, in U.S. Appl. No. 14/725,347 (49 pgs).

Non-Final Office Action dated Jul. 26, 2017, in U.S. Appl. No. 14/750,822 (15 pgs).

Final Office Action dated Oct. 6, 2017, in U.S. Appl. No. 14/702,321 (23 pgs).

Notice of Allowance and Fee Due dated Nov. 24, 2017, in U.S. Appl. No. 14/750,822 (8 pgs).

(56) References Cited

OTHER PUBLICATIONS

Response filed Dec. 19, 2017 in related U.S. Appl. No. 14/702,321 (11 pgs).
Non-Final Office Action dated Jun. 1, 2017, in related U.S. Appl. No. 14/635,577 (17 pgs).
Response filed Aug. 11, 2017, in related U.S. Appl. No. 14/635,577 (7 pgs).
BitTorrent; From Wikipedia, the free encyclopedia; Feb. 25, 2016; pp. 1-23; http://en.wikipedia.org/wiki/BitTorrent (22 pgs).
The Byzantine Generals Problem; ACM Transactions on Programming Languages and Systems (TOP LAS); vol. 4 Issue 3, Jul. 1982 pp. 382-401; ACM New York, NY, USA; http://dl.acm.org/citation.cfm?id=357176m (20 pgs).
Bitcoin: A Peer-to-Peer Electronic Cash System; Satoshi Nakamoto; www.bitcoin.org; May 24, 2009; pp. 1-9; hllps://bitcoin.org/bitcoin.pdf (9 pgs).
A Next Generation Smart Contract & Decentralized Application Platform, Vitalik Buterin; Ethereum White Paper; Aug. 16, 2005; pp. 1-36; hllps://www.ethereum.org/pdfs/EthereumWhitePaper.pdf (36 pgs).
Ethereum: A Secure Decentralised Genralised, Final Draft—Under Review; Dr. Gavid Wood; Lead, Ethereum Project; Apr. 6, 2014; pp. 1-34; http://gavwood.com/paper.pdf (32 pgs).
Final Office Action dated Oct. 24, 2017, in U.S. Appl. No. 14/635,577 (16 pgs).
Rizzo, Pete, "Fred Wilson: Blockchain Applications Still Biggest Opportunity in Bitcoin," Jan. 24, 2015, printed from the internet: URL:http://www.coindesk.com/fred-wilson-blockchain-applications-still-biggest-opportunity-bitcoin/, 7pgs.
Final Office Action dated Jan. 12, 2018, in U.S. Appl. No. 14/725,347 (43 pgs).
Notice of Allowance and Fees Due dated Jan. 29, 2018, in U.S. Appl. No. 14/702,321, (19 pgs).
Notice of Allowance and Fees Due dated Jan. 24, 2018, in U.S. Appl. No. 14/750,822, (17 pgs).

\* cited by examiner

DEFERRED CONFIGURATION OR INSTRUCTION EXECUTION USING A SECURE DISTRIBUTED TRANSACTION LEDGER

CROSS-REFERENCE TO RELATED APPLICATION

This patent application claims priority to and is a continuation-in-part of co-pending and commonly-owned U.S. patent application Ser. No. 14/702,321, filed on 1 May 2015, entitled "DEVICE REPORTING AND PROTECTION SYSTEMS AND METHODS USING A SECURE DISTRIBUTED TRANSACTIONAL LEDGER," listing Daniel A. Ford and YuLing Chen as inventors, which claims priority to and is a continuation-in-part of co-pending and commonly-owned U.S. patent application Ser. No. 14/635,577, filed on 2 Mar. 2015, entitled "CONTAINERIZED COMPUTATIONAL TASK EXECUTION MANAGEMENT USING A SECURE DISTRIBUTED TRANSACTION LEDGER," listing Daniel A. Ford as inventor. Each of the above-mentioned patent documents is incorporated by reference herein in its entirety and for all purposes.

TECHNICAL FIELD

The present disclosure relates to information handling devices, such as smart phones, tablets, servers, and laptops. More particularly, the present disclosure related to systems and methods for facilitating is how to send a message, independent of a centralized resource, to be retrieved at a future time.

DESCRIPTION OF THE RELATED ART

As the value and use of information continues to increase, individuals and businesses seek additional ways to process and store information. One option available to users is information handling systems. An information handling system, or computing device, generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use, such as financial transaction processing, airline reservations, enterprise data storage, or global communications. In addition, information handling systems may include a variety of hardware and software components that may be configured to process, store, and communicate information and may include one or more computer systems, data storage systems, and networking systems.

The last several years have also seen a dramatic increase in the use of computing devices and also in computing capacity. As a result, information handling systems exists, in many different applications and form factors—including servers, laptops, mobile phones, tablets, smart watches, phablets, appliances, smart packages, etc. These devices provide powerful computing resources that require particular configuration.

Conventionally, there are three primary ways in which these devices are configured. First, they are configured by the manufacturer or seller before they are shipped to the end user/customer. A problem with this approach is that the configuration typically cannot be changed once the device has left the manufacturer's or seller's premise. A second way these devices may be configured is to be sent one or more messages from a centralized site. Messages pass from one computer to another and can be delivered quickly, typically within milliseconds. However, there are situations where messages need to be persisted for some time and delivered much later, potentially many months later. Finally, a third way these devices may be configured is to connect to a centralized site that is usually owned and operated by the manufacturer, seller, or some other centralized operator.

While the prior solutions may be implemented in a centralized manner, such approaches have some signification drawbacks. First, these centralized services have limited resources and can suffer from resource constraints. If the centralized service is at capacity, the service may not be able to provide instructions to a device. Second, the end user is relying on the security of these centralized services to maintain integrity of the system. If the centralized service does not have good security systems and practices, the data and the centralized service, itself, may be attacked. Also, because it is a centralized service, it is susceptible to spoofing and other such attacks. Third, the end user must rely on the centralized provider for the device to correctly operate. If that centralized provider is blocked or no longer offers the service, then the end user's device may not receive the instructions. Finally, the centralized service has a powerful role and can compromise the operation of the device or take actions that are unwanted by the end user.

Accordingly, what is needed are systems and methods that facilitate communicating a message, independent of a centralized resource, to be retrieved at a future time.

BRIEF DESCRIPTION OF THE DRAWINGS

References will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

DETAILED DESCRIPTION OF THE PREFERRED EMBODIMENTS

Figure 1:
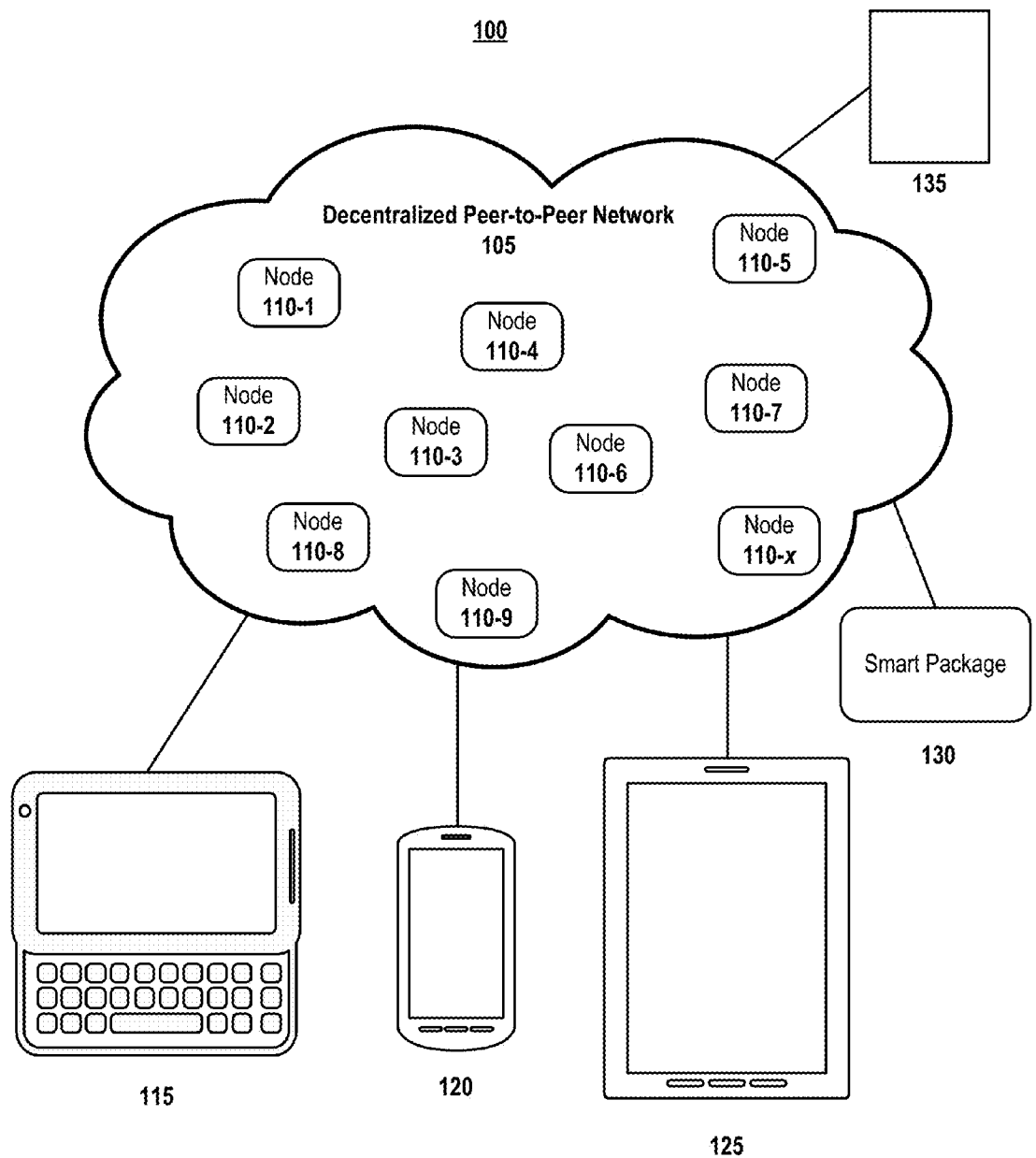
FIG. 1 depicts a decentralized network for providing communications to and from devices according to embodiments of the present invention.

In the following description, for purposes of explanation, specific details are set forth in order to provide an understanding of the invention. It will be apparent, however, to one skilled in the art that the invention can be practiced without these details. Furthermore, one skilled in the art will recognize that embodiments of the present invention, described below, may be implemented in a variety of ways, such as a process, an apparatus, a system, a device, or a method on a tangible computer-readable medium.

Components, or modules, shown in diagrams are illustrative of exemplary embodiments of the invention and are meant to avoid obscuring the invention. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," or "communicatively coupled" shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the invention and may be in more than one embodiment. Also, the appearances of the above-noted phrases in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated.

The terms "messages," "blocks," and "data," shall be understood to mean a group of bits that can be transported across a network. These terms shall not be interpreted as limiting embodiments of the present invention to particular configuration; and, these terms along with similar terms such as "data," "data traffic," "information," "cell," etc. may be replaced by other terminologies referring to a group of bits, and may be used interchangeably. The terms "include," "including," "comprise," and "comprising" shall be understood to be open terms and any lists the follow are examples and not meant to be limited to the listed items. Any headings used herein are for organizational purposes only and shall not be used to limit the scope of the description or the claims.

Furthermore, it shall be noted that: (1) certain steps may optionally be performed; (2) steps may not be limited to the specific order set forth herein; (3) certain steps may be performed in different orders; and (4) certain steps may be done concurrently.

A. General Overview

Aspects of the present invention provide systems and methods that facilitate communicating a message, independent of a centralized resource, to be retrieved at a future time.

In embodiments, a secure distributed transactional ledger, which is a publicly readable data structure that is maintained by a large number of distributed, separately owned, and administered computers, may be used to communicate configuration-related messages to devices. Thus, so long as the ledger is maintained, the contents of a ledger are always accessible, and, due to the manner in which the ledger is maintained, can always be trusted. Thus, any messages entered into a ledger may be retrieved in the future without hindrance. For example, a message may be retrieved by a smart transportation container or by a newly activated computer. In embodiments, the messages may be obfuscated (e.g., encrypted) such that their true nature cannot be determined except by the end recipient. In embodiments, a message may cause a computing device to function normally or to become disabled. Either way, access to the block chain means that the messages will be receivable by the computing device without hindrance.

In embodiments, the process of reporting and configuring a device is designed such that if the process is hindered, such as by a malicious agent (e.g., someone who has stolen the device or someone who has not properly paid for functionality of the device or access to contents in a smart package), then the process restricts the device from functioning. Also, the decentralized nature of the systems disclosed herein also prevents elements of the process, external to the device being protected, from being hindered, or corrupted, when performing their functions. In embodiments, if either aspect is compromised, the device may not function properly.

It shall also be noted that there are several advantages to such systems. For example, the advantages of using a secure distributed transactional ledger include that it is a widely accessible, redundantly distributed, data structure that provides logical and temporal decoupling between both ends of a communications dialog. This is useful because, by its nature, it is highly available, is extremely secure, and allows indirect communication. It shall be noted that the last point is useful because it dramatically simplifies how communication channels are established and maintained when more specific network addressing information might not be available. This is the case when a computing device will be connected in the future to an arbitrary network and receive an address that cannot be known beforehand, and as such cannot be directly addressed.

Additional details are provided by way of illustration through description of various embodiments, below. These embodiments are provided by way of illustration and not limitation; one skilled in the art shall recognize other applications and embodiments that fall within the scope of the invention.

B. Decentralized Network Implementations

FIG. 1 depicts an embodiment of a distributed peer-to-peer network 105, which comprises a plurality of nodes 110-1 through 110-$n$ (which may be referred to herein individually or collectively (depending upon context) as 110-$x$) and may be implemented by a plurality of information handling systems. In embodiments, an information handling system includes any instrumentality or aggregate of instrumentalities operable to compute, classify, process, transmit, receive, retrieve, originate, switch, route, store, display, manifest, detect, record, reproduce, handle, or utilize any form of information, intelligence, or data for business, scientific, control, entertainment, or other purposes. For example, an information handling system can be a personal computer, a laptop computer, a smart phone, a tablet device, a smart package, or other electronic device, a network server, a network storage device, a switch router or other network communication device, or any other suitable device and may vary in size, shape, performance, functionality, and price. Further, an information handling system may include processing resources for executing machine-executable code, such as a central processing unit (CPU), a programmable logic array (PLA), an embedded device such as a System-on-a-Chip, or other control logic hardware. An information handling system may also include one or more computer-readable media for storing machine-executable code, such as software or data. Additional components of an information handling system can include one or more storage devices that can store machine-executable code, one or more communications ports for communicating with external devices, and various input and output (I/O) devices, such as a keyboard, a mouse, and a video display.

Peer-to-peer network 105 represents a computing environment for operating a decentralized framework that maintains a distributed data structure, which may be referred to herein as a secure distributed transaction ledger or a block chain. This secure distributed transaction ledger may support various functions, such as distributing computational tasks from one or more systems to one or more other systems, supporting a cryptocurrency and messaging, among other functions.

To maintain the secure distributed transaction ledger among the various nodes 110-$x$ in the peer-to-peer network 105, a set of procedures are followed. Generally, such a network would suffer from inherent uncertainty and distrust between the nodes when they transact because they are typically unaffiliated with each other, may be transacting across vast distances (including in different countries), may be transacting anonymously, and because there is no centralized control or management to monitor or to resolve disputes. However, because the ledger is maintained publicly (i.e., all nodes can get a copy of the ledger) and because it is maintained according to set procedures that employ cryptographic methods and a proof-of-work concept, the uncertain and distrust elements are mitigated.

Thus, in embodiments, the secure distributed transaction ledger, or block chain, is a public ledger maintained collectively by the nodes in the network 105. The block chain includes blocks with data regarding recent transactions and/or messages, linking data that links one block to its previous block in the block chain, proof-of-work data that ensures that the state of the block chain is valid, and is endorsed by the majority of the record keeping systems. Furthermore, in embodiments, all confirmed transactions are included in the block chain and are done so using cryptography. This way, the integrity and the chronological order of the block chain are enforced and can be independently verified by each node.

In embodiments, the new transactions are added to the block chain using a distributed consensus system that confirms these pending transactions by including them in the block chain through a process commonly referred to as "mining." Mining enforces a chronological order in the block chain and helps create and maintain integrity of the system. For transactions to be confirmed during the mining process, the transactions must be packed in a block and linked to the prior block, all according to a set procedures involving cryptography (e.g., cryptographic checksums).

Properly adding a block to the chain is very computationally intensive, but it is also relatively easy to verify. Because of this computational asymmetry, the block chain can be readily verified but nearly impossible to modify while maintaining the correct chaining. Thus, this linking prevents previous blocks from being modified because doing so would invalidate all following blocks.

In embodiments, as a reward for mining, nodes earn fees for the transactions that they successfully add to the block chain. However, the mining is so difficult that it essentially creates a competitive lottery between the nodes in which the node that is able to successfully add the block to the chain, before any other node, gets rewarded. In embodiments, the reward can be units of a cryptocurrency.

A cryptocurrency is a virtual currency that utilizes a block chain to maintain and operate payment transactions securely and transparently. Examples of different instances of cryptocurrencies include Bitcoin, Linkcoin, Ripple, Nxt, Ether, or other cryptocurrencies.

In embodiments, data is received by one or more nodes in the peer-to-peer network for inclusion in the block chain. This data is generally referred to as a "transaction" and is made available generally to the nodes in the peer-to-peer network. A node that is functioning as a mining node will collect a set of such transactions and group them into a prototype block for potential inclusion as the next block in the block chain. That linkage is recorded by storing the unique identifier (i.e., the cryptographic checksum) of the most recent block in the chain inside of the (new) prototype block such that any reference to the prototype block (via its yet-to-be-determined cryptographic checksum identifier) can be used to find the block previous to it in the chain (i.e., the current block). This arrangement creates a linked "chain" of blocks that can be easily traversed.

The prototype block will only be included in the generally available block chain maintained by the peer-to-peer network if its cryptographic checksum identifier (e.g., a 256-bit integer) meets particular constraints; typically it must be less than a certain, network-determined, value. To accomplish this, the mining node must set the value of an integer called the "nonce," which will be included in the checksum calculations of the prototype block, to any value that produces an appropriate checksum value. All of the blocks in the block chain contain such a value to produce an appropriate cryptographic checksum value for their particular block; typically each value will be different.

The process of determining the value of the nonce is non-trivial, and basically amounts to a search through all possible nonce values. Finding such a value is conventionally called "proof-of-work," reflecting the large amounts of computational effort (i.e., "work") required to find a valid nonce value. In reality, finding a valid nonce value is really much more like "winning" a computational "lottery."

Once a mining node finds a valid nonce value for its prototype block, it then broadcasts the block to the other nodes in the peer-to-peer network. The block will be validated by the other nodes in the network, by, among other means, computing its cryptographic checksum. The network nodes express their acceptance of the new block by working on creating the next (prototype) block in the chain, a block with a different set of transactions, and (most likely) a different nonce value. The cryptographic checksum identifier of the newly accept block will be included in the prototype block to maintain the integrity of the chain.

Another agreed-upon procedure is that the nodes always consider the longest chain to be the correct one. Because it may take time for the block to propagate through the network and because two nodes may broadcast different versions of the next block at the same time, some nodes may receive one version of the block before the other version. In such cases, a node will work on the first one it received, but save the other branch in case it becomes the longer block chain. The decision which branch to follow is made when the next proof-of-work is found and one branch becomes longer; the nodes that were working on the other branch will then switch to the longer branch. This process establishes a "consensus" version of the block chain (i.e., the one accepted by the majority), which is extremely difficult to corrupt; doing so would require mustering computational power greater than that of the current majority of mining nodes in the peer-to-peer network.

In embodiments, new transaction broadcasts do not necessarily need to reach all nodes. As long as they reach many nodes, they will get into a block. In embodiments, block broadcasts are also tolerant of dropped messages. If a node does not receive a block, it will request it when it receives the next block and realizes it missed one.

The initial concept of secure distributed transaction ledger, including cryptocurrency, was proposed in 2009 in a paper entitled "Bitcoin: A Peer-to-Peer Electronic Cash System," listing Satoshi Nakamoto as the author, which is incorporated by reference herein. The details of maintaining and assuring the state of a secure distributed transaction ledger (or block chain) are known in the art and shall not be discussed further herein.

Recently, the technology for secure distributed transaction ledgers has evolved to incorporate a wider range of information. In particular, new types of ledgers are including definitions of computation in the form of programs expressed as sequences of virtual machine "bytecode." The first known instance of this technology is a system called Ethereum. These programs can be invoked by "sending" data to their "addresses" (e.g., a 256-bit address), which were specified when they were originally recorded in the ledger. The execution of the computations using the data as input is part of the block chain "mining" process defined for the system. The result of such execution is either exhaustion of the resources provided for execution, resulting in no output, or the program completes and generates output. In the latter case, the result is returned to the "caller" or originator as another entry in the ledger.

Returning to FIG. 1, one or more information handling systems, such as a computer 115, mobile phone 120, tablet 125, smart package 130, or server 135 may be configured to connect to the distributed peer network 105 to receive a message or messages according to embodiments of the present invention. In embodiments, the devices may be full nodes of the peer-to-peer network in which they perform mining processes, or they may be watching nodes that perform limited functions, embodiments of which are described herein.

As previously mentioned, an area of applicability for transmitting deferred configurations/instructions is for computing devices that are out of communication for extended periods of time. Examples of such devices include smart packages, such as transportation containers that incorporate computation and communication capabilities, and computers that are only partially configured and are shipped distances before installation. In such cases, it may be useful to send the devices messages that they can retrieve after they arrive at their destinations. Those messages could include deferred configuration or other instructions. For example, a transportation container may be instructed to destroy its contents, or a computer may be instructed to load a new version of firmware.

Figure 2:
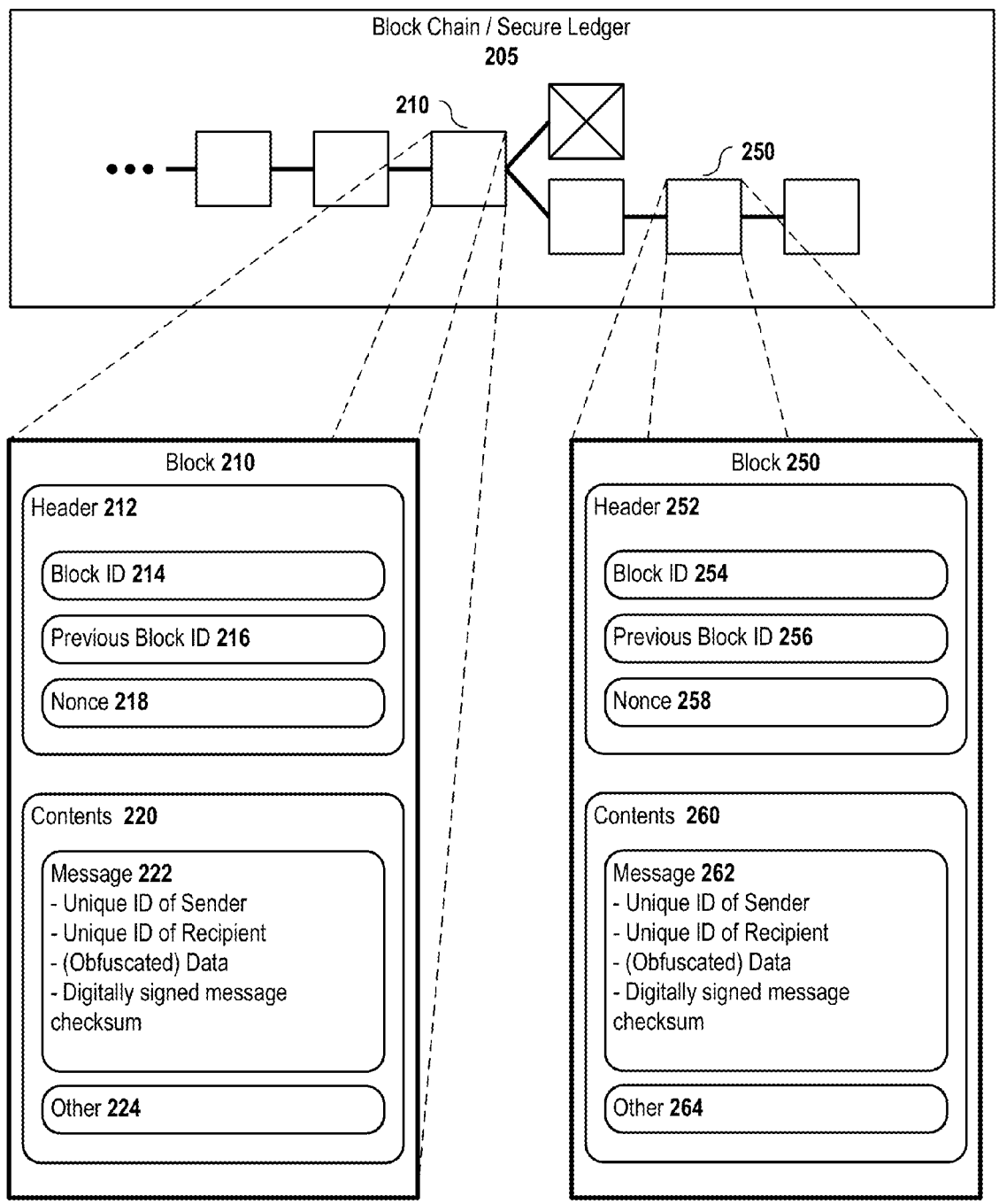
FIG. 2 graphically depicts a block chain or decentralized secure transaction ledger and two sample communications or messages according to embodiments of the present invention.

In embodiments, if those smart devices were to require a "final" message authorizing them to function normally (e.g., for the package to open or the computer to load firmware), then their access to such messages in general cannot be hindered. In embodiments, this inability of hinder access to the communications channel also allows the sender to send a final message that disables the device from operating normally (e.g., causing them to destroy their contents or not to enable functionality). FIG. 2 depicts example messaging that may be communicated via a distributed secure transaction ledger (or block chain) according to embodiments of the present invention.

C. Block Chain as a Communication Vehicle

In embodiments, a distributed secure transaction ledger, or block chain, may be used to communicate data between entities. FIG. 2 graphically depicts a block chain or decentralized secure transaction ledger 205 that is maintained by nodes in a peer-to-peer network. Also depicted in FIG. 2 is an example of two sample communications or messages according to embodiments of the present invention. It shall be noted that using the block chain to communicate information and messages has several benefits. First, messages can be sent to a device, from a device, or both. Second, it does not rely on a centralized authority. Third, once a message is added to the block chain, it cannot be altered or removed. Fourth, it is decentralized so it is difficult, if not impossible, to block access to it. And fifth, it can be posted for later retrieval by a device.

In embodiments, the block chain 205 may be used to receive messages from or send messages to a device using the block chain. Consider, by way of example, a message in block 210 of the block chain 205. In embodiments, a block 210 may contain a header 212 and contents 220.

In embodiments, the header 212 comprises a block ID 214 for that block, a block ID 216 of the previous block, and a nonce value 218, which represents the "proof of work." In embodiments, this information is used in linking the block into the block chain.

In embodiments, the contents 220 may comprise one or more messages 222 and may also include other data 224. In embodiments, a message 222 may comprise a unique identifier of the sender of the message (or owner/originator/sender of the message). This information may be used for one or more purposes. For example, the identifier helps the receiving device identify who sent the message. In embodiments, the device may be sent messages from various third parties, but may only take direction from an authorized set of one or more entities. The identifier of the owner or sender also provides a way by which the device can address a response to the sender, if desired. Additionally, the identifier of the owner/sender may be used or linked to an account to pay for processing fees or other fees associated with using the block chain as a communication channel, to perform computations, or other actions. Alternatively, a separate account identifier (not shown) may be specified and used for payment purposes.

In embodiments, the message 222 may include instructions, such as configuration-related data, for the device. In embodiments, this configuration-related data may be a link to configuration data, or may be the configuration data itself. In embodiments, the configuration-related data may be a program, a container, or a link to a program. In embodiments, a link to a program may comprise a unique identifier or an address to a program (or byte code) in the block chain, may be a link to an application available outside the block chain, or a combination thereof. Since this data is publicly in the ledger, the sender may obfuscate some or all of the message data by encrypting it.

In embodiments, the message 222 may include a way for authenticating the message. For example, in embodiments, the message 222 may include a digitally signed message checksum as way to verify the message. For example, the sender of the message may digitally sign a checksum or hash of the message using his or her private key. A receiving device can verify the integrity of the data by verifying the checksum or hash using the sender's public key. Those having skill in the art shall recognize that other methods for verifying the data's integrity may also be employed herein.

It shall be noted that embodiments of the present invention may include the device (e.g., a smart package or a computing device) sending a message. For example, the block chain 205 may be used to send messages regarding the confirmation, configuration status, results information, or other data. Consider, by way of example, a message in block 250 of the block chain 205. In embodiments, a block 250 may contain a header 252 and contents 260.

Like the header 212 discussed with respect to block 210, the header 252 of block 205 comprises a block ID 254 for that block, a block ID 256 of the previous block, and a nonce value 258, which represents the "proof of work."

Similar to the message in the block 210, in embodiments, the contents 260 may comprises one or more messages 262 and may also comprise other data 264. In embodiments, a message 262 may comprise a unique identifier of the recipient of the message, which may be the originator of the initial message 210 or another entity.

In embodiments, the message may include a unique identifier of the submitter of the message. This information may be used for one or more purposes. For example, the identifier helps identify who sent the message. Additionally, the identifier may be used or linked to an account to pay for or receive fees associated with using the block chain as a communication channel, for performing calculations, or other actions. Alternatively, a separate account identifier may be specified and used.

In embodiments, the message 262 includes data (e.g., confirmation of receipt of the message, confirmation of configuration, configuration status, results information, or other data). In embodiments, some or all of that data may be obfuscated by encryption.

In embodiments, the message 222 may include a digitally signed message checksum as way to verify the message. For example, the sender of the message may digitally sign a checksum or hash of the message using his or her private key. A receiving device can verify the integrity of the data by verifying the checksum or hash using the sender's public key. Those having skill in the art shall recognize that other methods for verifying the data's integrity may also be employed herein.

D. Embodiments of Methods

1. Access & Authentication

Figure 3:
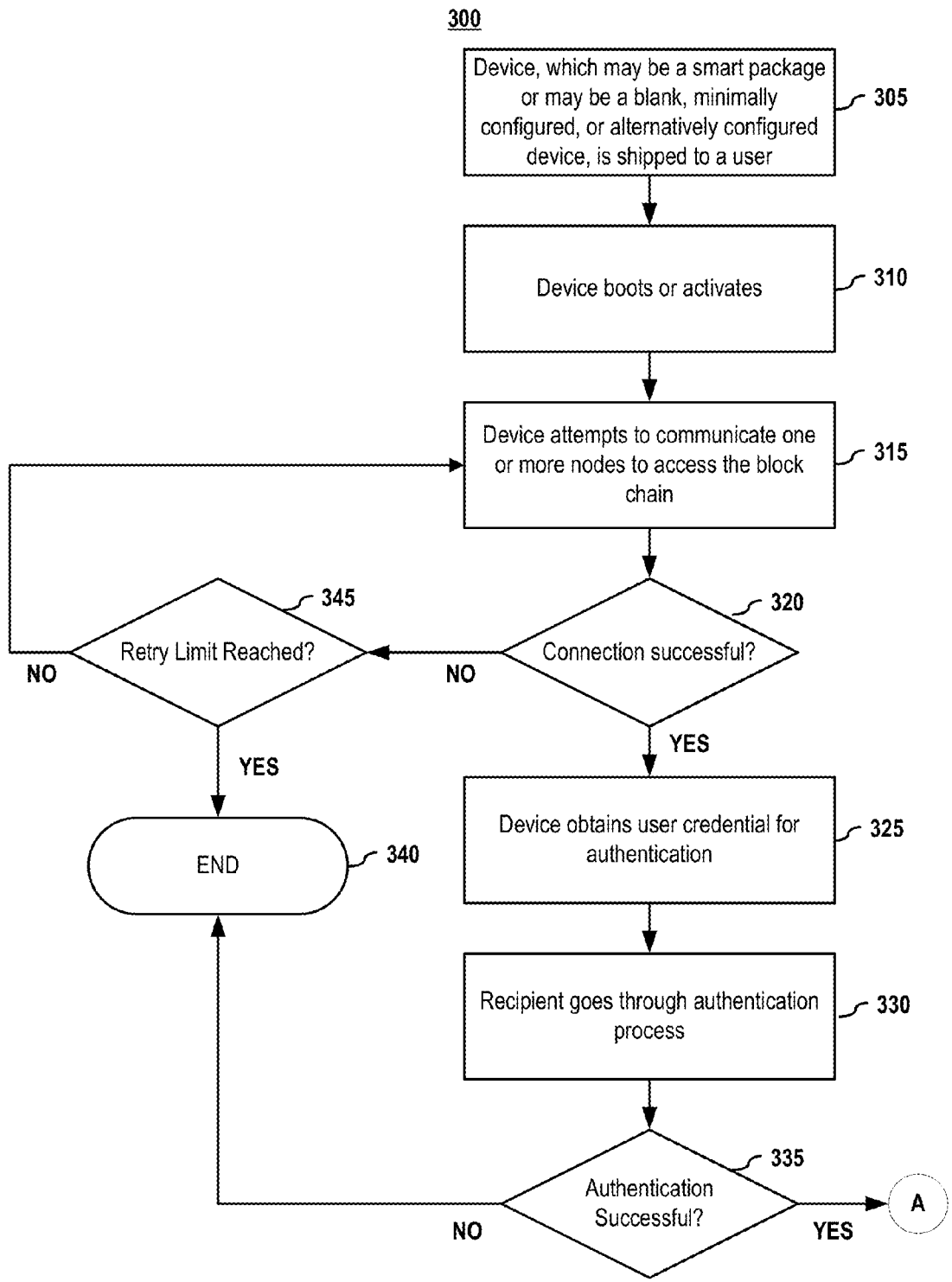
FIG. 3 depict a method for accessing a secure distributed transaction ledger according to embodiments of the present invention.

FIG. 3 depict a method for accessing a secure distributed transaction ledger by a device according to embodiments of the present invention. In embodiments, a device is shipped (305) to a user. In embodiments, the device may be a smart package or may be a device that is blank, minimally configured, or has some other alternative configuration.

In embodiments, the device seller or manufacture sets the device to be able to access a message via the block chain that will set the device's configuration state (e.g., an information handling system's configuration setting or a smart package configuration setting, for example, "open" or "do not open"). In embodiments, the seller may wait to publish the configuration message to the distributed peer network for inclusion in the block chain after one or more conditions have been met. For example, the seller may wait until payment from the end user has been verified as received or the final configuration setting as requested by the user has been set. It shall be noted that the message may be addressed to one device or may be addressed for a plurality of devices to be receive via the block chain.

In embodiments, the device boots or activates, if already booted but in a sleep or hibernate mode (310). Once active, the device attempts to communicate (315) with one or more nodes to access the block chain.

If the device is unable (320) to access the block chain, a check is made (345) to determine if the number of attempts to access the block chain has been exceeded. If the number has been exceeded, the process may take one or more actions, such as termination (340). In embodiments, one or more other actions may also be taken, such as the destruction of contents (e.g., in the case of a smart package), disabling some or all functions of the device, erasing data, capturing contextual data (e.g., picture of user, audio data of user and/or surroundings, etc.), sending one or more alert messages (e.g., via phone, text, email, or otherwise), such an alert message may include some of all of the contextual data, or presenting an alert or alerts to the current user of the device.

If the retry limit condition has not been reached, then the device may re-attempt (315) to communicate with one or more nodes to access the block chain. In embodiments, the device may wait until one or more conditions are met before re-attempting to communicate with the decentralized network. For example, in embodiments, the device may wait a certain amount of time, or until network connectivity is available, etc.

If the connection is successful, the device accesses the block chain and identifies a message or messages directed to it.

In embodiments, the device obtains (325) the credentials of a user attempting to access the device (e.g., open a smart package). The recipient device uses those user credentials, and data it extracts from the message or messages directed to it that came from the block chain, to undergo (330) an authentication process.

In embodiments, if the authentication is successful (335), one or more additional methods may be performed depending upon the nature of the device. For example, FIG. 4 depict a method for deferred configuration of a device using a secure distributed transaction ledger according to embodiments of the present invention, and FIG. 5 depict a method for deferred instructions of a device according to embodiments of the present invention.

2. Embodiments of Deferred Configuration

Figure 4:
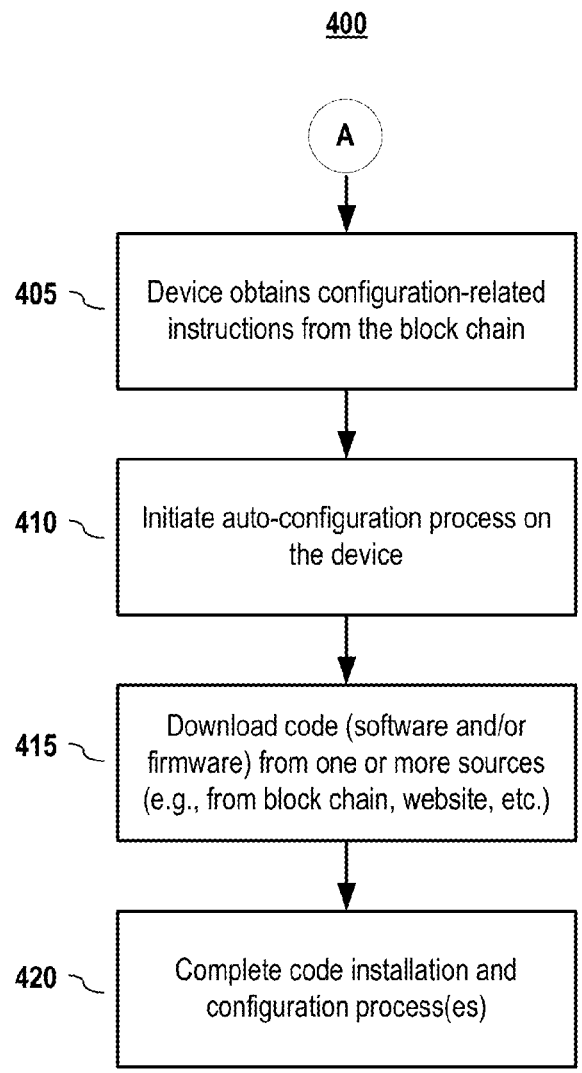
FIG. 4 depict a method for deferred configuration of a device using a secure distributed transaction ledger according to embodiments of the present invention.
Figure 5:
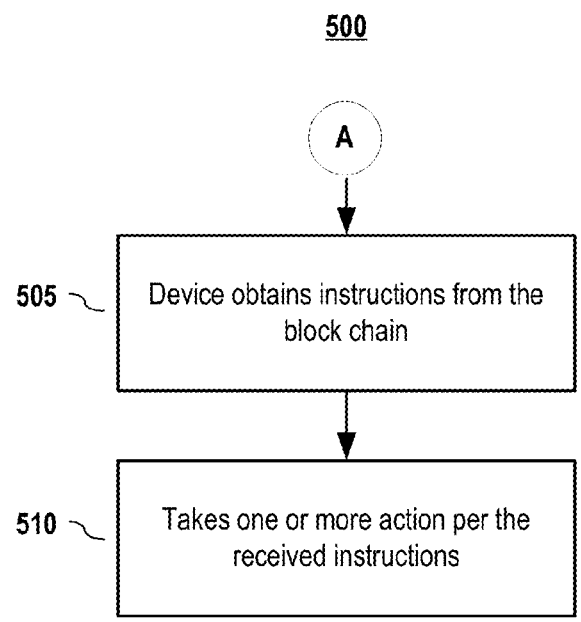
FIG. 5 depicts a method for deferred instruction execution by a device using a secure distributed transaction ledger according to embodiments of the present invention.

FIG. 4 depict a method for deferred configuration of a device using a secure distributed transaction ledger according to embodiments of the present invention. In embodiments, following authenticated, the device obtains (405) the configuration-related instructions from the block chain. In embodiments, an auto-configuration process is initiated (410) on the device where it decides if the configuration process requires additional data or instructions from other sources to complete. If appropriate or required for the particularly configuration instructions, the device may download (415) code (software, firmware, or both) for the configuration. In embodiments, the download may be from one or more blocks in the block chain, from a website, from a cloud resource, etc. Alternatively or additionally, the particular software and/or firmware may be stored in memory in the device and the instructions from the block chain unlock (e.g., unencrypt it) or otherwise allow access to it. With configuration instructions and the necessary code, the device completes (420) the installation and configuration process.

In embodiments, the device may send a status response to the configuration instruction message sender, to a third party, or both. In embodiments, the status message may indicate successful completion of the configuration or may indicate issues related to the configuration.

3. Embodiments of Deferred Instruction Execution

FIG. 5 depict a method for deferred instructions execution by a device according to embodiments of the present invention. In embodiments, following authentication, the device obtains (505) the instructions from the block chain. Given the instructions, the device takes (510) one or more actions based upon the received instructions.

In embodiments, the actions may include the device downloading data (software, firmware, data, or combinations thereof), accessing or deleting data from the device, sending one or more messages, activating or deactivating one or more features on the device, securing contents on or within the device, gathering data, reporting data, and the like.

In embodiments, the device may send a response message to the instruction message sender, to a third party, or both. In embodiments, the response message may indicate whether the instructions were successful executed, may indicate issues related to the execution of the instructions, or other data.

E. System Embodiments

As noted previously, areas of applicability of these methodologies are in transmitting deferred messages to computing devices that are out of communication for one or more periods of time. Examples of such devices are smart packages, such as transportation containers, that incorporate computation and communication, and information handling devices that are shipped and transported to an end user. In these cases, it is useful to send them messages that they can retrieve after they arrive at their destinations. Those messages may include deferred configuration instructions or other instructions. Presented below are examples systems embodiments.

1. Smart Packages

Figure 6:
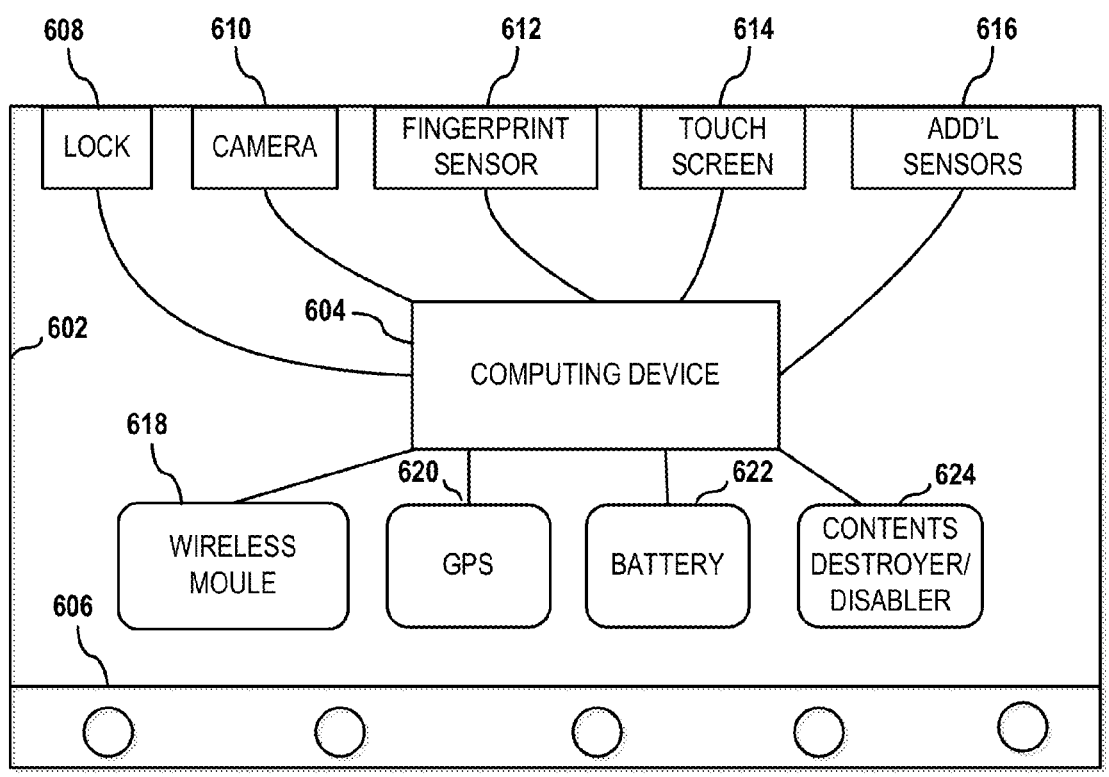
FIG. 6 depicts an exemplary smart package according to embodiments of the present invention.

Considering by way of example the smart package depicted in FIG. 6. A smart package may be implemented as an enclosure that comprises a locking mechanism, a computing system for safeguarding the contents of the package, and a power source. The package may be manufactured, for example, from aircraft grade aluminum for enhanced security and durability.

FIG. 6 illustrates an exemplary smart package according to various embodiments of the invention. In embodiments, a smart package 600 comprises container 602 having lock 608, hinges 606, a computing device 604, one or more wireless modules 618, and a battery 622. In embodiments, the smart package 600 may include additional components such as a camera 610, a fingerprint sensor 612, a touch screen 614, a GPS module 620, and contents destroyer/disabler module 624. In embodiments, a smart package 600 may be implemented as any lockable container, parcel, or device that is capable of protecting its contents, including a lockable clamshell design.

One skilled in the art will appreciate that smart package 600 may be implemented in any shape and be made from any suitable material or combination of materials. In embodiments, a smart package 600 may comprise one or more additional sensors 616, such as a vibration sensor, which are coupled to computer 604. The computing device 604 may be any computing system with a processor and connectivity to peripherals and may be powered by a power source, such as a battery. In embodiments, the computing device 604 may be the same or similar to that described in FIG. 7 (below). In embodiments, the computing device may be a small, inexpensive information handling system, such as a Raspberry PI-type computing device.

In embodiments, the computing device 604 directly or indirectly communicates with and controls the components such as the lock 608 and the contents destroyer/disabler 624. In embodiments, one or more components of smart package 600 communicate through wireless module 618 (e.g., Bluetooth, Bluetooth LE, 802.11, or other wireless protocols) to access the block chain.

In embodiments, the smart package may access the block chain via the wireless module 618 and executes the instructions, which may be to destroy its contents or grants access thereto. For example, the contents destroyer/disabler module 624 may contain caustic chemicals, inks, small explosives, or other items that, when deployed per instructions, would destroy the contents of the package 600 and/or the package itself. Alternatively, the contents may be digital contents that are erased, disabled, or otherwise made inaccessible or unusable for the end user. In embodiments, instead of fully enabling or fully disabling/destroying the contents, there may be levels of disability (or levels of enablement) or destruction of the contents based upon the instructions.

2. Information Handling System

In embodiments, aspects of the present patent document may also be directed to information handling systems. For purposes of this disclosure, an information handling system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data for business, scientific, control, or other purposes. For example, an information handling system may be a personal computer (e.g., laptop), tablet computer, phablet, personal digital assistant (PDA), smart phone, smart watch, smart package, server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 7:
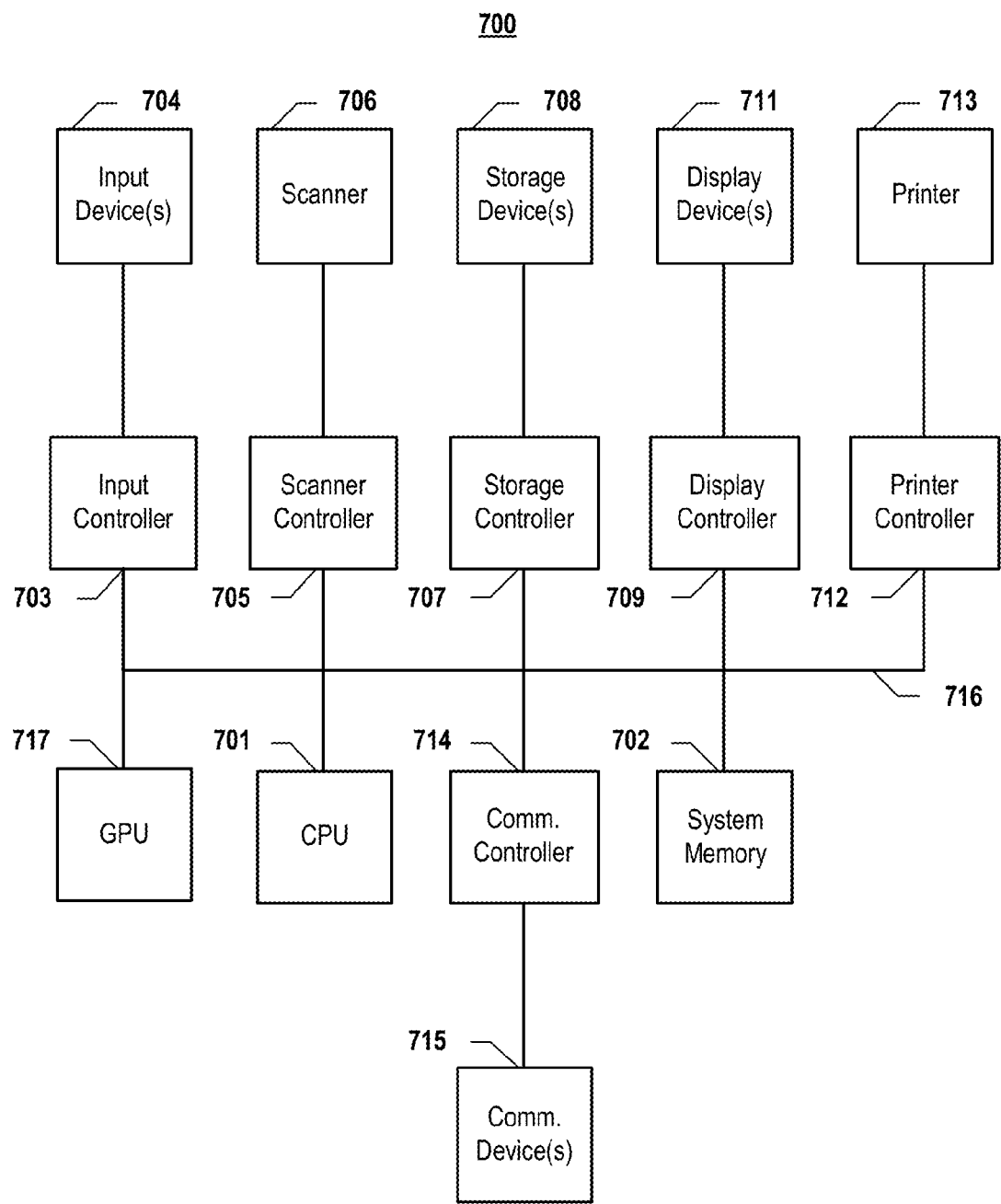
FIG. 7 depicts a simplified block diagram of an information handling system according to embodiments of the present invention.

FIG. 7 depicts a simplified block diagram of an information handling system according to embodiments of the present invention. It will be understood that the functionalities shown for system 700 may operate to support various embodiments of an information handling system—although it shall be understood that an information handling system may be differently configured and include different components.

As illustrated in FIG. 7, system 700 includes one or more central processing units (CPU) 701 that provides computing resources and controls the computer. CPU 701 may be implemented with a microprocessor or the like, and may also include one or more graphics processing units (GPU) 717 and/or a floating point coprocessor for mathematical computations. System 700 may also include a system memory 702, which may be in the form of random-access memory (RAM), read-only memory (ROM), or both.

A number of controllers and peripheral devices may also be provided, as shown in FIG. 7. An input controller 703 represents an interface to various input device(s) 704, such as a keyboard, mouse, or stylus. There may also be a scanner controller 705, which communicates with a scanner 706. System 700 may also include a storage controller 707 for interfacing with one or more storage devices 708 each of which includes a storage medium such as magnetic tape or disk, or an optical medium that might be used to record programs of instructions for operating systems, utilities, and applications, which may include embodiments of programs that implement various aspects of the present invention. Storage device(s) 708 may also be used to store processed data or data to be processed in accordance with the invention. System 700 may also include a display controller 709 for providing an interface to a display device 711, which may be a cathode ray tube (CRT), a thin film transistor (TFT) display, or other type of display. The computing system 700 may also include a printer controller 712 for communicating with a printer 713. A communications controller 714 may interface with one or more communication devices 715, which enables system 700 to connect to remote devices through any of a variety of networks including the Internet, a cloud resource (e.g., an Ethernet cloud, an Fiber Channel over Ethernet (FCoE)/Data Center Bridging (DCB) cloud, etc.), a local area network (LAN), a wide area network (WAN), a storage area network (SAN) or through any suitable electromagnetic carrier signals including infrared signals.

In the illustrated system, all major system components may connect to a bus 716, which may represent more than one physical bus. However, various system components may or may not be in physical proximity to one another. For example, input data and/or output data may be remotely transmitted from one physical location to another. In addition, programs that implement various aspects of this invention may be accessed from a remote location (e.g., a server) over a network. Such data and/or programs may be conveyed through any of a variety of machine-readable medium including, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices.

3. Deferred Configuration or Deferred Instruction Execution

In embodiments, the smart package 600 or the computing device 700 may comprise one or more deferred configuration/instruction executing modules for performing one or more of the methods discussed herein. Embodiments of deferred instructions/deferred configuration modules are described in more detail with reference to FIGS. 8 and 9.

Figure 8:
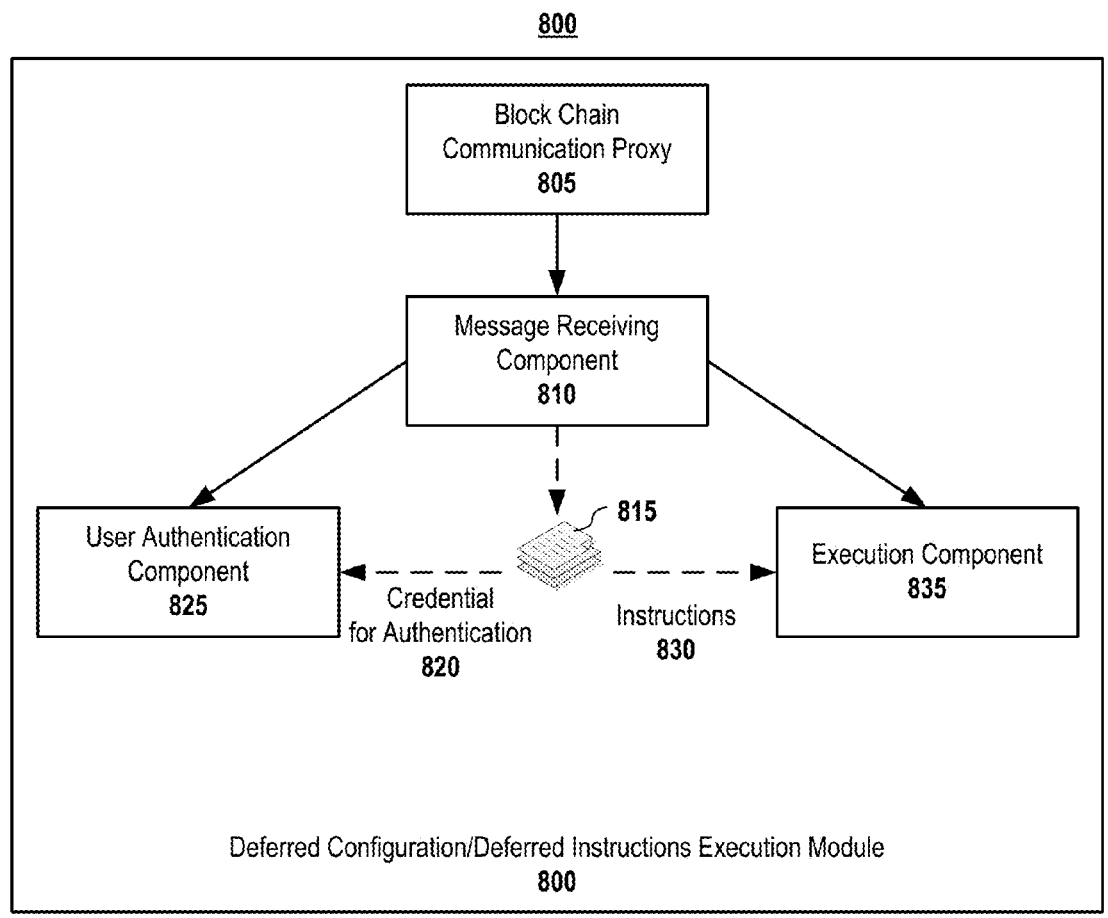
FIG. 8 depicts a simplified block diagram of deferred instructions or deferred configuration modules according to embodiments of the present invention.

FIG. 8 depicts a simplified block diagram of deferred instructions or deferred configuration modules according to embodiments of the present invention. In embodiments, the modules depicted in FIG. 8 operate to perform one or more of the methods described above.

In embodiments, the deferred configuration or deferred instruction module 800 comprises a block chain communication proxy module 805, a message receiving module 810, a message intended for the device that contains data and/or instructions extracted from the block chain 815, a user authentication component 825, and an execution component 835.

In embodiments, the block chain communication proxy module 805 is used to interface with the distributed network (e.g., network 105). In embodiments, one of its functions is to abstract the details of the communications channel by leveraging the block chain to retrieve and store data. In embodiments, the block chain communication proxy module 805 receives messages from the block chain and uses the digital signature associated with the message to authenticate that the source of the message is from an entity from which the device should take messages. In embodiments, the block chain communication proxy module 805 identifies message directed to the device and extracts the message from the data block. In embodiments, the module 805 may include an encryption module (not shown) to perform one or more encryption/decryption-related functions. In embodiments, the block chain communication proxy module 805 passes messages from the block chain to the message receiving module 810.

Responsive to the message being from a verified source from which the device should take instruction, the instructions 830 are sent to an execution component 835. In embodiments, the execution component 835 may execute the instructions to lock or unlock features, such as access to content, a function, or an item. In embodiments dealing with configuration, the execution component may comprise one or more additional modules for configuring the device, as shown in FIG. 9.

Figure 9:
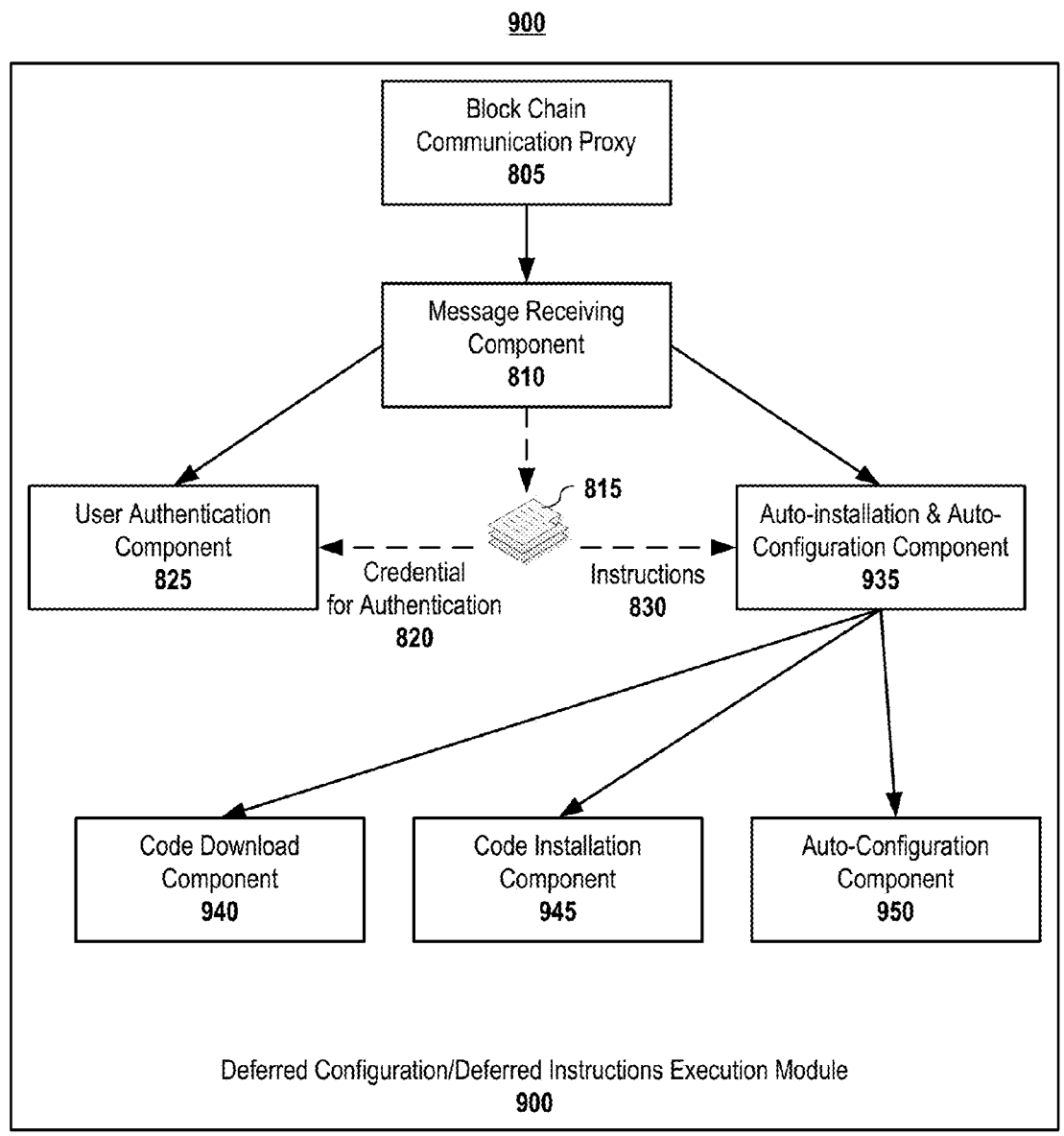
FIG. 9 depicts a simplified block diagram of an alternative embodiment of deferred instructions or deferred configuration modules according to embodiments of the present invention.

FIG. 9 depicts a simplified block diagram of deferred instructions or deferred configuration modules according to embodiments of the present invention. As shown in FIG. 9, the execution component 835 may be or may include an auto-installation and auto-configuration component 935 that comprises one or more modules. In embodiments, these modules may comprise a code (software, firmware, or both) download component 940 that downloads code for configuring the device, a code installation component 945 that installs the downloaded code, and an auto-configuration component 950 that configures the device based upon the received instructions and code.

It shall be noted that device configuration embodiments and device instruction execution embodiments may comprise all or some combination of the components described in FIGS. 8 and 9, depending upon desired functionalities.

In embodiments, the module 800/900 may also include a system interface module to interface with the system components for various purposes. For example, the system interface may interface with the one or more components of the device to read and/or write data, to send and receive data (including messages), to disable or enable features, and to display alerts. In embodiments, the system interface may use existing interfaces of the system. In embodiments, these interfaces provide abstract representations of the physical devices. In embodiments, these abstractions separate the functions from the details of a particular hardware instance or architecture. This ensures that embodiments of the present invention are applicable to a broad class of information handling devices that can provide such interface abstractions.

In embodiments, the module 800/900 may also include a mining module (not shown) to perform mining operations related to the distribute network and the maintenance of the block chain. Because this process can be resource intensive, the computing device may not perform full mining functions. In embodiments, the computing device may only perform limited functionality. In embodiments, the computing device may only perform resource intensive operations when the computing device is plugged into a stable, continuous power source rather than a battery. In embodiments, the computing device may be such that it is loaded compared to its computational capacity. An example might be a device embedded in relatively static environment such as a building or a vehicle, where it is well powered and has good network connectivity, and that monitors environmental parameters (e.g., the temperature). Such a device would be a good candidate to play the role of a mining node in the distributed network.

Embodiments of the present invention may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present invention may further relate to computer products with a non-transitory, tangible computer-readable medium that have computer code thereon for performing various computer-implemented operations. The media and computer code may be those specially designed and constructed for the purposes of the present invention, or they may be of the kind known or available to those having skill in the relevant arts. Examples of tangible computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter. Embodiments of the present invention may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present invention. One skilled in the art will also recognize that a number of the elements described above may be physically and/or functionally separated into sub-modules or combined together.

It will be appreciated to those skilled in the art that the preceding examples and embodiments are exemplary and not limiting to the scope of the present invention. It is intended that all permutations, enhancements, equivalents, combinations, and improvements thereto that are apparent to those skilled in the art upon a reading of the specification and a study of the drawings are included within the true spirit and scope of the present invention.

What is claimed is:

1. A computer-implemented method for facilitating deferred configuration of an information handling device, the method comprising:
   attempting to access a distributed peer network that maintains a block chain, the block chain comprising a cryptographically linked sets of data blocks;
   responsive to being able to access the distributed peer network, obtaining at least part of the block chain;
   examining one or more of the data blocks for a message specifically addressed to the information handling device;
   responsive to identifying a message addressed to the information handling device, verifying whether the message was sent by an authorized entity; and
   responsive to the message being from a verified authorized entity, executing one or more instructions in the message.

2. The computer-implemented method of claim 1 wherein the message comprising instructions for configuring the information handling device to add or enable one or more features of the information handling device.

3. The computer-implemented method of claim 2 wherein the step of configuring the information handling device to add or enable one or more features of the information handling device comprises:
   initiating an auto-configuration process on the information handling device;
   downloading code from one or more sources; and
   completing code installation and configuration processes of the information handling device to add or enable the one or more features.

4. The computer-implemented method of claim 1 wherein the message comprises instructions for configuring the information handling device to remove or disable one or more features of the information handling device.

5. The computer-implemented method of claim 1 wherein the information handling device is part of a smart package that comprises contents and the message comprises instructions for affecting access to the contents.

6. The computer-implemented method of claim 5 wherein affecting access to contents comprises:
   granting access to the contents of the smart package responsive to the message comprising instructions to grant access to the contents; and
   denying access to the contents of the smart package responsive to the message comprising instructions to deny access to the contents.

7. The computer-implemented method of claim 6 wherein denying access to the contents comprises rendering the contents unusable.

8. The computer-implemented method of claim 1 further comprising:
   gathering data about the information handling device regarding execution of the one or more instructions in the message; and
   submitting at least some of the gathered data to one or more nodes in the distributed peer network for inclusion into a data block that is added to the block chain.

9. The computer-implemented method of claim 1 further comprising:
   responsive to not being able to access the distributed peer network, determining whether a threshold number of attempts to access the distributed peer network has been exceeded;
   responsive to the threshold number of attempts to access the distributed peer network not having been exceeded:
      waiting until a condition has been met; and
      retrying to access the distributed peer network; and
   responsive to the threshold number of attempts to access the distributed peer network having been exceeded, taking one or more actions related to securing the information handling device.

10. The computer-implemented method of claim 9 wherein the step of taking one or more actions related to securing the information handling device comprises at least one of:
   disabling access to, operation of, or both of one or more features of the information handing device.

11. An information handling device comprising:
   one or more processors;
   one or more memory components communicatively coupled to the processor;
   one or more network interfaces, communicatively coupled to the processor, that provides access to one or more networks; and
   a deferred instructions subsystem comprising:
      a block chain communication proxy, communicatively coupled to the network interface, that interfaces with one or more decentralized nodes of a peer network, the peer network comprising a plurality of nodes that maintain a cryptographically secure and public block chain comprising a cryptographically linked sets of data blocks;
      a message receiving component that identifies a message in the block chain specifically addressed to the information handling device and extracts the message;
      a user authentication component, communicatively coupled to the message receiving component, that receives at least part of the message from the message receiving component and authenticates that the message originated from an authorized entity from which the information handling device should take instruction; and
      an execution component, communicatively coupled to the message receiving module, that executes one or more instructions in the message that affect a feature related to the information handling device.

12. The information handling device of claim 11 wherein one or more instructions in the message that affect a feature related to the information handling device comprises instructions for configuring the information handling device to add or enable one or more features of the information handling device.

13. The information handling device of claim 12 wherein the execution component performs the step of configuring the information handling device to add or enable one or more features by performing the steps comprises:
   initiating an auto-configuration process on the information handling device;
   downloading code from one or more sources; and
   completing code installation and configuration processes of the information handling device to add or enable the one or more features.

14. The information handling device of claim 11 wherein the one or more instructions in the message that affect a feature related to the information handling device comprises the execution component executing one or more instructions that remove or disable one or more features of the information handling device.

15. The information handling device of claim 11 wherein the information handling device is part of a smart package that comprises contents and wherein the one or more instructions in the message that affect a feature related to the information handling device comprises the information handling device affecting access to the contents.

16. The information handling device of claim 15 wherein affecting access to contents comprises:
   granting access to the contents of the smart package responsive to the message comprising instructions to grant access to the contents; and
   denying access to the contents of the smart package responsive to the message comprising instructions to deny access to the contents.

17. The information handling device of claim 16 wherein denying access to the contents comprises rendering the contents unusable.

18. A computer-implemented method for deferred configuration of an information handling system comprising:
   configuring the information handling system to be able to access a distributed peer network that maintains a block chain, the block chain comprising a cryptographically linked sets of data blocks;
   shipping the information handling system to a recipient;
   generating a message regarding a configuration state for the information handling system; and
   submitting the message specifically addressed to the information handling system to one or more nodes in the distributed peer network for inclusion in a data block in the block chain.

19. The computer-implemented method of claim 18 wherein the message comprising instructions for configuring the information handling device to add or to remove one or more features of the information handling device.

20. The computer-implemented method of claim 18 wherein the message comprises a containerized computational task for setting the configuration state for the information handling system.

* * * * *